(12) United States Patent
Lee

(10) Patent No.: US 8,792,043 B2
(45) Date of Patent: Jul. 29, 2014

(54) FOCUS-FIXED CAMERA MODULE

(75) Inventor: Jungyul Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 161 days.

(21) Appl. No.: 13/344,264

(22) Filed: Jan. 5, 2012

(65) Prior Publication Data

US 2012/0169907 A1 Jul. 5, 2012

(30) Foreign Application Priority Data

Jan. 5, 2011 (KR) .................. 10-2011-0000780

(51) Int. Cl.
H04N 5/225 (2006.01)
(52) U.S. Cl.
USPC ............ 348/340; 348/335; 348/373; 348/374
(58) Field of Classification Search
USPC ................... 348/335, 340, 373, 374
See application file for complete search history.

(56) References Cited

U.S. PATENT DOCUMENTS

2010/0110270 A1* 5/2010 Sekimoto et al. ............. 348/340
2010/0320367 A1* 12/2010 Tsai et al. ..................... 250/216
2011/0085072 A1* 4/2011 Jung ............................. 348/342

* cited by examiner

Primary Examiner — Antoinette Spinks
(74) Attorney, Agent, or Firm — Birch, Stewart, Kolasch & Birch, LLP

(57) ABSTRACT

The present disclosure relates to a focus-free camera module minimized in height deviation of depth of focus, the focus-fixed focus-free camera module including: an image sensor; a PCB (Printed Circuit Board) mounted with the image sensor; a barrel mounted at an upper surface of the image sensor and accommodated with a lens therein; a holder attached to an upper surface of the PCB to accommodate the barrel; and adhesive means adhering an outer circumference of the barrel to an inner circumference of the holder, such that no height deviation in depth of focus is generated by adhesive structure in which a bottom distal end surface of the barrel is tightly adhered to an upper surface of an image sensor side without any separate medium.

20 Claims, 1 Drawing Sheet

FOCUS-FIXED CAMERA MODULE

This application claims the benefit of earlier filing date and right of priority to Korean Patent Application No. 10-2011-0000780, filed on Jan. 5, 2011, the contents of which is hereby incorporated by reference in their entirety.

BACKGROUND OF THE DISCLOSURE

1. Field

The teachings in accordance with the exemplary embodiments of this present disclosure generally relate to a focus-free camera module, and more particularly to a focus-free camera module configured to solve a de-focus caused by deviation in epoxy thickness through minimization of the deviation.

2. Background

Generally, a small-sized compact camera module is mounted on various portable terminals such as mobile phones, smart phones, PDAs (Personal Digital Assistants) and tablet PC. The camera module is generally manufactured using an image sensor chip or a photoelectric conversion device of a CCD (Charge Coupled Device) type or a CMOS (Complementary Metal Oxide Semiconductor) type to converge light from an object to a photosensitive element and to form an image of the object on a display medium such as a display device.

Recently, the small-sized camera module is marketed with auto-focusing and/or zooming functions. The camera module with these functions incorporated thereon is mostly mounted on a portable terminal with a sophisticated specification.

Meantime, a focus-free camera module must minimize a height deviation between an optical system and an image sensor due to narrowness in depth of focus. To this end, an upper surface of an image sensor is conventionally coupled with a housing mechanism using epoxy. However, a height deviation on each product varies depending on epoxy-coated amount to create a problem. On top of that, the epoxy height cannot be evenly controlled to create product defects caused by de-focusing.

SUMMARY

The present disclosure has been made to solve the foregoing problems of the prior art and therefore an object of certain embodiments of the present disclosure is to provide a newly-structured focus-free camera module configured to prevent de-focusing caused by height deviation by reducing to a minimum the height deviation between an optical system and an image sensor using adhesive through improved housing structure.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the invention, as embodied and broadly described, and in one general aspect of the present invention, there is provided a focus-free camera module, the camera module comprising: an image sensor; a PCB (Printed Circuit Board) mounted with the image sensor; a barrel mounted at an upper surface of the image sensor and accommodated with a lens therein; a holder attached to an upper surface of the PCB to accommodate the barrel; and adhesive means adhering an outer circumference of the barrel to an inner circumference of the holder.

Preferably, the adhesive means mutually couples the barrel and an upper distal end of the holder.

Preferably, the adhesive means is a thermosetting resin.

Preferably, the adhesive means is an epoxy.

Preferably, the image sensor is a chip-on-board (COB) type sensor.

Preferably, a bottom distal end surface of the barrel is tightly adhered to an upper surface of the image sensor.

Preferably, the image sensor is a chip scale package (CSP) type sensor, and the image sensor is further formed at an upper surface with a cover member.

Preferably, the bottom distal end surface of the barrel is tightly adhered to an upper surface of the cover member.

Preferably, depth of focus is determined by a mechanism height of the barrel.

Preferably, the holder functions as a guide guiding an assembly position of the barrel.

In another general broad aspect of the present invention, there is provided a focus-free camera module, the camera module comprising: an image sensor; a PCB (Printed Circuit Board) mounted with the image sensor; a barrel mounted at an upper surface of the image sensor and accommodated with a lens therein; a holder attached to an upper surface of the PCB to accommodate the barrel in an inner space; and adhesive means adhering an upper outer circumference of the barrel to an inner circumference of the holder opposite to the upper outer circumference of the barrel.

Preferably, the adhesive means is a thermosetting epoxy resin.

Preferably, the image sensor is a chip-on-board (COB) type sensor.

Preferably, a bottom distal end surface of the barrel is tightly adhered to an upper surface of the image sensor.

Preferably, the image sensor is a chip scale package (CSP) type sensor, and the image sensor is further formed at an upper surface with a cover member.

Preferably, the bottom distal end surface of the barrel is tightly adhered to an upper surface of the cover member.

Preferably, depth of focus is determined by a mechanism height of the barrel.

Preferably, the holder functions as a guide guiding an assembly position of the barrel.

Preferably, the holder is fixed to an upper lateral surface of the PCB using holder adhesive means.

Preferably, the holder adhesive means is provided with a same material as that of the adhesive means, wherein the holder adhesive means and the adhesive means are thermosetting epoxy resin.

The focus-free camera module according to the present disclosure has an advantageous effect in that a barrel receiving a lens and a holder forming an exterior are separately formed, an outer circumference of the barrel is adhered to an inner circumference of the holder, and a bottom distal end surface of the barrel is tightly adhered to an upper surface of an image sensor side without any separate medium, such that depth of focusing is determined only by a mechanism height of the barrel, and height deviation of epoxy does not act as a factor determining the depth of focus to solve a de-focusing problem caused by the height deviation of adhesive means.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Descriptions of well-known components and processing techniques are omitted so as to not unnecessarily obscure the embodiments of the disclosure.

Hereinafter, a focus-free camera module will be described in detail with reference to the accompanying drawings.

Figure 1:
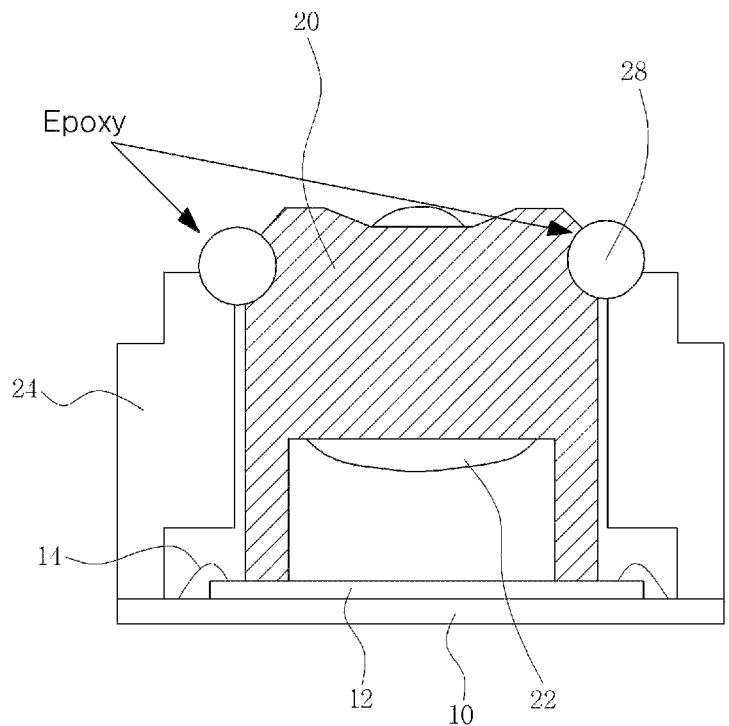
FIG. 1 is a cross-sectional view illustrating a camera module according to an exemplary embodiment of the present invention.
Figure 2:
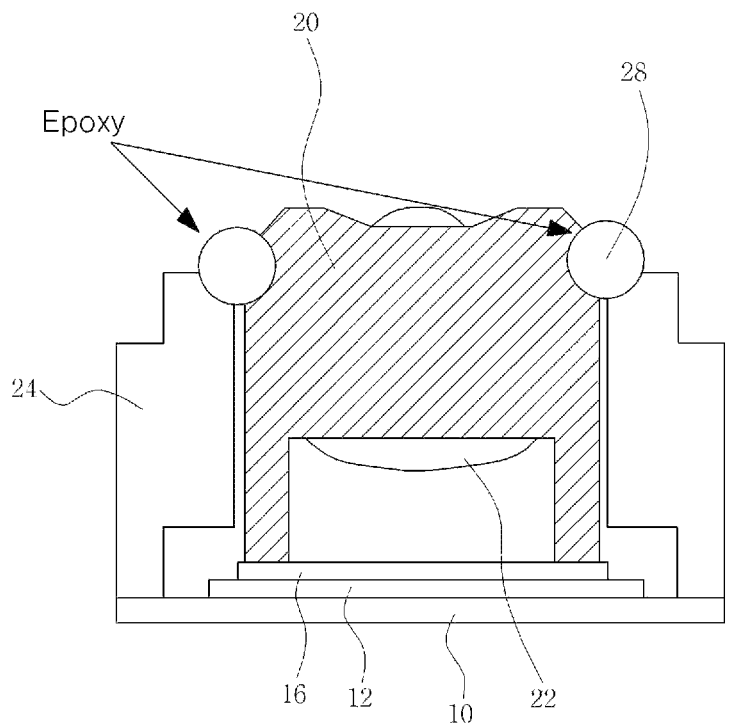
FIG. 2 is a cross-sectional view illustrating a camera module according to another exemplary embodiment of the present invention.

FIG. 1 is a cross-sectional view illustrating a camera module according to an exemplary embodiment of the present invention, and FIG. 2 is a cross-sectional view illustrating a camera module according to another exemplary embodiment of the present invention, where an image sensor in FIG. 1 is exemplified as a COB (Chip On Board) type and an image sensor in FIG. 2 is exemplified as a CSP (Chip Scale Package) type. No redundant explanation will be provided in FIG. 2 that duplicates that of FIG. 1.

The focus-free camera module according to the exemplary embodiments of the present disclosure is formed with a fixed focus as that of the prior art. Therefore, no AF (Auto Focusing) module or a VCM (Voice Coil Motor) is present.

Referring to FIG. 1, an upper surface of a PCB 10 is formed with a COB type image sensor 12. The COB type image sensor is such that an active pixel area is formed on the board, and bonding pad is formed at a margin of the board, and the image sensor is connected to the PCB 10 via a wire bonding. The image sensor 12 is a CCD (Charge Coupled Device) or a CMOS (Complementary Metal Oxide Semiconductor).

A housing of the camera module according to an exemplary embodiment of the present disclosure is formed with a barrel 20 and a holder 24 in a separate configuration. The barrel 20 accommodates a lens 22 therein with no screw threads on an outer circumference. The holder 24 serves as a guide guiding an assembly position of the barrel 20. In order to help understand the present disclosure more easily, a cross-section of the barrel 20 is indicated with a hatching treatment.

As illustrated, a bottom distal end surface of the holder 24 is attached to an upper surface of the PCB 10. Thus, the holder 24 has nothing to do with the image sensor 12 in terms of adhesive relation, such that part tolerance of the holder 24 and coupled thickness have no influence on depth of focus.

The barrel 20 is inserted into a hollow hole of the holder 24 under an assembled state. At this time, there is no mechanical coupling structure between the barrel 20 and the holder 24, such that the barrel 20 is assembled by sliding on an inner wall surface of the holder 24. As illustrated, a bottom distal end surface of the barrel 20 is tightly adhered to an upper surface of the image sensor 12.

An outer circumference of the barrel 20 is tightly adhered to an inner circumference of the holder 24 using adhesive means while the barrel 20 is inserted into the holder 24. As illustrated, in order to prevent the adhesive means from having influence on depth of focus, an upper surface of outer circumference of the barrel 20 is mutually coupled to an upper surface of inner circumference of the holder 24.

At this time, the adhesive means is epoxy 28 which is a thermosetting resin, for example. As shown in FIG. 1, in a case a housing is heated under a high temperature while the epoxy 28 is coated, the epoxy 28 is cured to complete the assembly of the housing.

If the focus-free camera module is thus configured, a bottom distal end surface of the barrel 20 becomes tightly and directly adhered to an upper surface of the image sensor 12, whereby there exists no factor determining the depth of focus except for mechanical tolerance of the barrel 20.

That is, unlike the fact that the conventional focus-free camera module has developed de-focusing problem due to mechanical tolerance and height deviation in epoxy, the focus-free camera module according to the exemplary embodiments of the present disclosure can rule out the height deviation of epoxy from factors determining the focus. This enables a further uniform standardization of mass-manufactured products and would be conducive to reduction of defect rate caused by de-focusing.

FIG. 2 is a cross-sectional view illustrating a camera module applied to CSP type image sensor according to another exemplary embodiment of the present invention.

The CSP type image sensor is such that the image sensor 12 is provided in chip type, and the CSP type sensor is formed at an upper surface with a cover member 16, where the cover member 16 is a molded glass, for example.

If the camera module according to the present disclosure is applied to the CSP type image sensor, a bottom distal end surface of the barrel 20 is tightly adhered to an upper surface of the cover member 16. Other configuration of housing is identical as that of FIG. 1.

Even in the structure of FIG. 2, the factor determining the depth of focus may also include thickness of cover member 16 and height of mechanism in the barrel 20. The adhesive thickness of epoxy has nothing to do with the factor.

The mechanisms such as glass for cover member 16 and barrel 20 are parts that are processed with a very high precision. Therefore, even if the depth of focus is narrow as in the focus-free camera module, there is generated little change in depth of focus by mechanism tolerance.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The camera module and the manufacturing method thereof according to the present invention has an industrial applicability in that a de-focusing problem caused by the height deviation of adhesive means is solved because depth of focusing is determined only by a mechanism height of the barrel, and height deviation of epoxy does not act as a factor determining the depth of focus.

What is claimed is:

1. A camera module, the camera module comprising:
an image sensor;
a PCB (Printed Circuit Board) mounted with the image sensor;
a barrel fixed at an upper surface of the image sensor and accommodated with a lens therein; and
a holder attached to an upper surface of the PCB to accommodate the barrel;
wherein the barrel is configured such that an inner circumference of the holder is adhered to an outer circumference of the barrel by adhesive means to allow the barrel to be fixed on the upper surface of the image sensor,
wherein the barrel is taller than the holder, and
wherein the adhesive means is injected on an exposed area of the outer circumference of the barrel after mounting of the barrel and holder.

2. The camera module of claim 1, wherein the adhesive means mutually couples the barrel and an upper distal end of the holder.

3. The camera module of claim 1, wherein the adhesive means is a thermosetting resin.

4. The camera module of claim 3, wherein the adhesive means is an epoxy.

5. The camera module of claim 1, wherein the image sensor is a chip-on-board (COB) type sensor.

6. The camera module of claim 5, wherein a bottom distal end surface of the barrel is tightly adhered to an upper surface of the image sensor.

7. The camera module of claim 1, wherein the image sensor is a chip scale package (CSP) type sensor, and the image sensor is further formed at an upper surface with a cover member.

8. The camera module of claim 7, wherein the bottom distal end surface of the barrel is tightly adhered to an upper surface of the cover member.

9. The camera module of claim 1, wherein depth of focus is determined by a mechanism height of the barrel.

10. The camera module of claim 1, wherein the holder functions as a guide guiding an assembly position of the barrel.

11. A camera module, the camera module comprising:
an image sensor;
a PCB (Printed Circuit Board) mounted with the image sensor;
a barrel fixed at an upper surface of the image sensor and accommodated with a lens therein; and
a holder attached to an upper surface of the PCB to accommodate the barrel in an inner space;
wherein the barrel is configured such that an upper outer circumference of the barrel is adhered to an inner circumference of the holder opposite to the upper outer circumference of the barrel, using adhesive means to allow the barrel to be fixed on the upper surface of the image sensor after mounting of the barrel and holder.

12. The camera module of claim 11, wherein the adhesive means is a thermosetting epoxy resin.

13. The camera module of claim 11, wherein the image sensor is a chip-on-board (COB) type sensor.

14. The camera module of claim 13, wherein a bottom distal end surface of the barrel is tightly adhered to an upper surface of the image sensor.

15. The camera module of claim 11, wherein the image sensor is a chip scale package (CSP) type sensor, and the image sensor is further formed at an upper surface with a cover member.

16. The camera module of claim 15, wherein the bottom distal end surface of the barrel is tightly adhered to an upper surface of the cover member.

17. The camera module of claim 11, wherein depth of focus is determined by a mechanism height of the barrel.

18. The camera module of claim 11, wherein the holder functions as a guide guiding an assembly position of the barrel.

19. The camera module of claim 11, wherein the holder is fixed to an upper lateral surface of the PCB using holder adhesive means.

20. The camera module of claim 19, wherein the holder adhesive means is provided with a same material as that of the adhesive means, wherein the holder adhesive means and the adhesive means are thermosetting epoxy resin.

\* \* \* \* \*